Dec. 22, 1953  O. CARDELL  2,663,345
ANTISKID DEVICE
Filed July 19, 1951
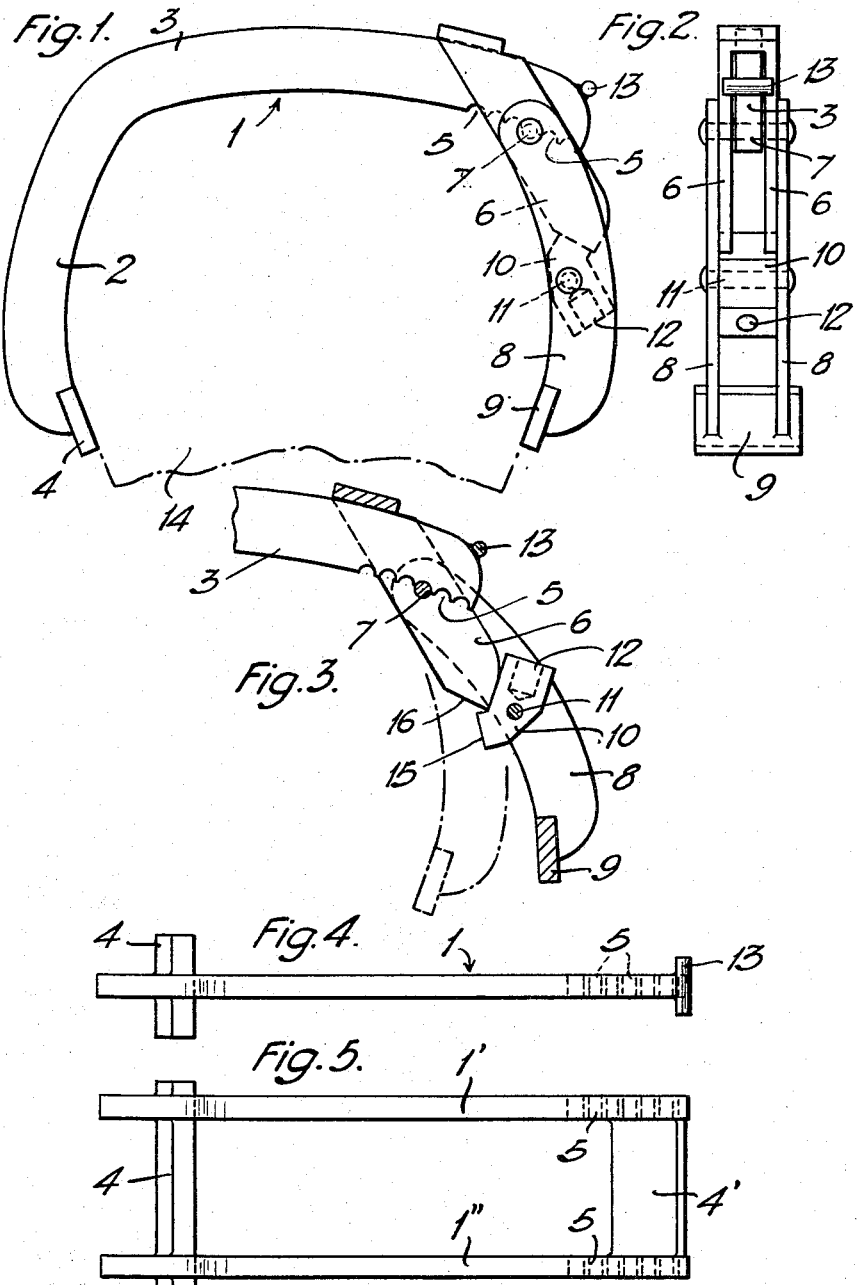
Inventor
Olof Cardell
by Sommers & Young
Attorneys Patented Dec. 22, 1953

2,663,345

UNITED STATES PATENT OFFICE 2,663,345

ANTISKID DEVICE

Olof Cardell, Sollentuna, Sweden

Application July 19, 1951, Serial No. 237,518

7 Claims. (Cl. 152—225)

This invention relates to anti-skid devices for mounting on tires, particularly pneumatic or other rubber tires and has for its primary object to provide such a device which may easily be adapted to tires of different widths.

Another object of the invention is to provide an anti-skid device effectively gripping the tire to prevent loosening of the device therefrom.

Still another object of the invention is to provide an anti-skid device which may easily be mounted on the tire and removed therefrom.

The invention will hereinafter be described in greater particulars with reference to the accompanying drawing illustrating a preferred embodiment thereof.

On said drawing:

Fig. 1 is a side elevation of the present anti-skid device mounted on a tire.

Fig. 2 is an end view of the anti-skid device.

Fig. 3 is a fragmentary side elevation, partly in section, illustrating elements of the anti-skid device in the position thereof prior to the mounting of the anti-skid device onto the tire, a pivotable member of the anti-skid device being in addition for the sake of comparison also shown in dash-and-dot lines in operative position.

Fig. 4 is a plan view of an L-shaped member of the anti-skid device.

Fig. 5 is a plan view similar to Fig. 4 for illustrating a modified double L-shaped member.

The anti-skid device illustrated in Figs. 1–4 comprises a substantially L-shaped or angular member generally denoted by 1 and constructed with two legs 2 and 3 substantially at right angles to each other. Leg 2 supports adjacent the free end thereof a cross member 4 whereas leg 3 adjacent the free end thereof is provided internally with a set of spaced semicircular recesses 5.

In addition to member 1 the anti-skid device comprises a second member 6 in the form of an inverted U-shaped link straddling the free end of leg 3 at the top and at two opposite sides thereof. Fixedly mounted between the shanks of link 6 is a pin 7 engaging in one of the recesses 5. Obviously link 6 may be adjusted in the longitudinal direction of leg 3 and pin 7 inserted into another recess 5 for adapting the anti-skid device to tires having widths varying within a certain range.

Pivotally mounted on link 6 by means of pin 7 is a lever 8 consisting of two arms encompassing the legs of link 6 and interconnected at the bottom ends by means of a cross member 9.

Mounted for rotation between the arms of lever 8 is a cam 10 supported by a pin 11 and provided with a bore 12 for applying a suitable implement for rotating cam 10.

After mounting link 6 on leg 3 a stop 13 is welded or otherwise secured to the free end of leg 3 for preventing an undesired separation of elements 1 and 6.

When the anti-skid device above described is to be mounted on a tire, such as 14, Fig. 1, cam 10 occupies the position shown in Fig. 3, lever 8 being then in the position shown in full lines whereby the anti-skid device may easily be applied onto tire 14, the cross members 4 and 9 being then moved to points below the maximum width of tire 14. The implement referred to is then inserted in bore 12 and turned clockwise in Fig. 3 whereby cam 10 is rotated clockwise. Cam 10 then cooperates with the bottom end of link 6 but as the latter cannot rotate outwards in relation to leg 3, lever 8 will be rotated inwards about pin 7 for pressing lever 8 and leg 2 against tire 14.

As both lever 8 and leg 2 consist of relatively thin bars mounted edgewise on tire 14 said bars will be pressed into tire 14 to some extent for counteracting the tendency of the anti-skid device to slide along tire 14 in operation.

As shown cam 10 is constructed with a flat surface 15 which in rotating cam 10 finally engages flat surfaces 16 at the bottom of link 6 for locking the anti-skid device on tire 14.

As may be seen from Fig. 1 link 6 and lever 8 in the operative position of the anti-skid device are substantially aligned and besides cam 10 in this position is situated within the outline of lever 8. Thus, projecting parts are substantially avoided which might interfere with existing mudguards or the like on the vehicle.

When the anti-skid device no longer is required one need only rock cam 10 counter-clockwise in Fig. 1 so as to move cam 10 to the position shown in Fig. 3 whereupon the anti-skid device may easily be removed from tire 14.

For certain tires it may be suitable to use a double L-shaped member as indicated in Fig. 5, both arms 1' and 1" being then provided with recesses 5 at one end and interconnected also at that end by a cross member 4'. Link 6 is situated between arms 1' and 1".

What I claim is:

1. An anti-skid device for mounting on a tire, comprising a first, substantially L-shaped member, composed of two legs, one of which legs is adapted to be placed against one side of a tire, a second member supported by said first member adjacent the free end of the other leg thereof and adjustable into different positions along said other leg toward and away from said one leg, said second member engaging said other leg in such a manner that said second member in each adjusted position is locked against rotation away from said one leg, a third member pivoted to said second member, and a tightening means operating between said second and third members for rotating said third member relatively to said second member toward said one leg of said first member for pressing said third member against the other side of said tire.

2. An anti-skid device for mounting a tire, comprising a first, substantially L-shaped member, composed of two legs, one of which legs is adapted to be placed against one side of a tire, a second member supported by said first member adjacent the free end of the other leg thereof and adjustable into different positions along said other leg toward and away from said one leg, one of said first and second members being provided with a set of spaced recesses and the other having an element insertable into any of said recesses, both of said first and second members engaging each other also at another point to prevent rotation of said second member relatively to said first member away from said one leg, a third member pivoted to said second member, and a tightening means operating between said second and third members for rotating said third member relatively to said second member toward said one leg of said first member for pressing said third member against the other side of said tire.

3. An anti-skid device for mounting on a tire, comprising a first, substantially L-shaped member, composed of two legs, one of which legs is adapted to be placed against one side of a tire, a second member supported by said first member adjacent the free end of the other leg thereof and adjustable into different positions along said other leg toward and away from said one leg, said other leg internally being provided with a set of spaced recesses whereas said second member has a pin fitting in any of said recesses, and grips said other leg externally thereof to prevent rotation of said second member away from said one leg, a third member pivoted to said second member, and a tightening means operating between said second and third members for rotating said third member relatively to said second member toward said one leg of said first member for pressing said third member against the other side of said tire.

4. An anti-skid device for mounting on a tire, comprising a first, substantially L-shaped member, composed of two legs, one of which legs is adapted to be placed against one side of a tire, a second member supported by said first member adjacent the free end of the other leg thereof and adjustable into different positions along said other leg toward and away from said one leg, said second member engaging said other leg in such a manner that said second member in each adjusted position is locked against rotation away from said one leg, a third member pivoted to said second member, and a tightening means operating between said second and third members for rotating said third member relatively to said second member toward said one leg of said first member for pressing said third member against the other side of said tire all of said members being made of bars adapted to be mounted edgewise on said tire.

5. An anti-skid device for mounting on a tire, comprising a first, substantially L-shaped member, composed of two legs, one of which legs is adapted to be placed against one side of a tire, a second member supported by said first member adjacent the free end of the other leg thereof and adjustable into different positions along said other leg toward and away from said one leg, said second member engaging said other leg in such a manner that said second member in each adjusted position is locked against rotation away from said one leg, a third member pivoted to said second member, and a tightening means operating between said second and third members and comprising a cam mounted for rotation on said third member and adapted upon rotation in one direction to cooperate with said second member for rotating said third member to press against the other side of said tire.

6. An anti-skid device for mounting on a tire, comprising a first, substantially L-shaped member, composed of two legs, one of which legs is adapted to be placed against one side of a tire, a second member supported by said first member adjacent the free end of the other leg thereof and adjustable into different positions along said other leg toward and away from said one leg, said second member engaging said other leg in such a manner that said second member in each adjusted position is locked against rotation away from said one leg, a third member pivoted to said second member, and a tightening means operating between said second and third members for rotating said third member relatively to said second member toward said one leg of said first member for pressing said third member against the other side of said tire, said second and third members in the operative position of said anti-skid device being substantially aligned, and said tightening means in said position being situated substantially inside the outline of said third member.

7. An anti-skid device for mounting on a tire, comprising a first, substantially L-shaped member, composed of two legs, one of which legs is adapted to be placed against one side of a tire, a second member supported by said first member adjacent the free end of the other leg thereof and adjustable into different positions along said other leg toward and away from said one leg, said other leg internally being provided with a set of spaced recesses whereas said second member has a pin fitting in any of said recesses, and grips said other leg externally thereof to prevent rotation of said second member away from said one leg, a third member pivoted to said second member by means of said pin, and a tightening means operating between said second and third members for rotating said third member relatively to said second member toward said one leg of said first member for pressing said third member against the other side of said tire.

OLOF CARDELL.

References Cited in the file of this patent

UNITED STATES PATENTS

| Number | Name | Date |
|---|---|---|
| 1,775,211 | Pearson | Sept. 9, 1930 |
| 2,467,654 | Boje | Apr. 19, 1949 |